(Model.)

E. BAILEY.
LAMP TRIMMING SHEARS.

No. 249,818. Patented Nov. 22, 1881.

Fig. II.

Witnesses.
H. F. Willson.
C. H. Lippy

Inventor.
Eli Bailey

UNITED STATES PATENT OFFICE.

ELI BAILEY, OF ELYRIA, OHIO, ASSIGNOR TO HIMSELF, AND CLAYTON JOHNSTON AND J. L. CLARK, BOTH OF SAME PLACE.

LAMP-TRIMMING SHEARS.

SPECIFICATION forming part of Letters Patent No. 249,818, dated November 22, 1881.

Application filed May 6, 1881. (Model.)

*To all whom it may concern:*

Be it known that I, ELI BAILEY, a subject of the Kingdom of Great Britain, residing at Elyria, in the county of Lorain and State of Ohio, have invented new and useful Improvements in Lamp-Trimming Shears, of which the following is a specification.

My invention relates to lamp-trimming shears in which the cutting-blades are curved so as to give to the wick of an ordinary lamp the form of an arc of a circle, in order to prevent the corners of the wick from distorting the form of the illuminating flame, as is almost invariably the case when straight blades are used, thus involving the necessity of clipping the corners of the wick; and my invention consists in combining with said curved blades a suitable receptacle, into which the severed portion of the wick will fall; and, also, in having said receptacle form a gage for the purpose of enabling the operator to so adjust the shears as to leave the upper corners of the wick on a level. I attain these objects by the devices illustrated in the accompanying drawings, in which—

Figure 1:
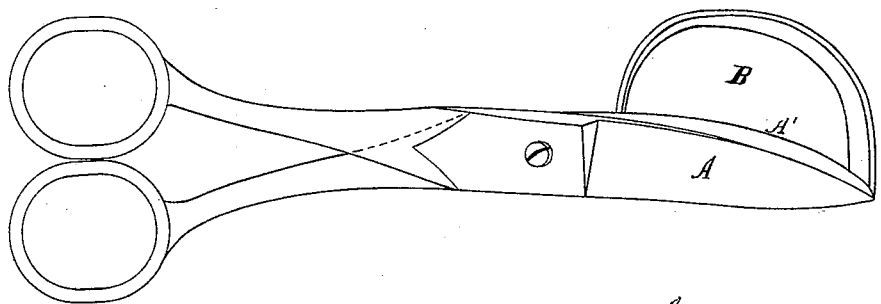
Figure 1:
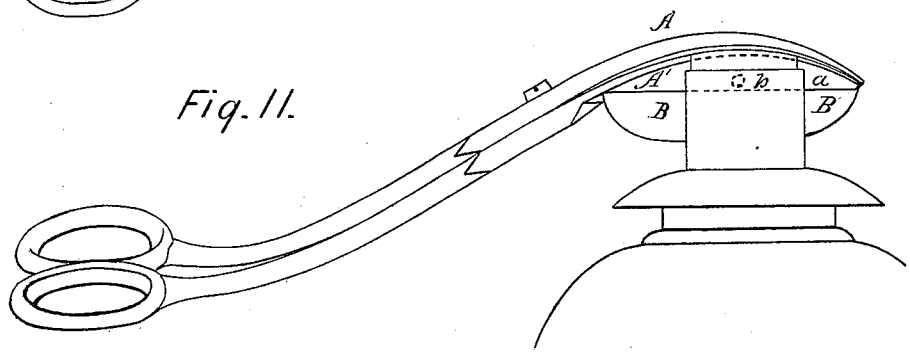

Figure 1 is a plan view. Fig. 2 is a side elevation, showing its application to the wick of an ordinary lamp.

Similar letters refer to similar parts throughout the several views.

In the drawings, A A' represent the cutting-blades, which are pivoted together in the ordinary manner. Said blades are curved or bent in such a manner as to form an arc of a circle of suitable radius in the line of their cut.

To the under side of the under blade, A', a suitable tray or pan, B, is secured, so that its inner edge coincides with the cutting-edge of the shear-blade to which it is secured, as seen at *a*, Fig. 2. The side *a* of said pan extends downward from the cutting-edge of the blade, so as to form a guard, which, when in operation, rests against the side of the wick-tube. Upon this guard is formed a mark, *b*, for the purpose of indicating the point at which the shears should be adjusted to the wick. In practice this indicating-point should be so placed as to coincide with the center of the wick. Then the hand should be elevated so as to bring the lower edge of the guard to a horizontal, or to a right angle, to the line of the wick-tube. Then the shearing may be done, giving the results before mentioned. If the shear is not adjusted as described to the wick, then one side will be lower than the other, and the flame will not be symmetrical in form; but when care is taken the very best results may be easily attained.

I am aware that curved blades have been used to which a pan for the purpose of catching the severed portion of the wick has been secured; but I am not aware that the pan has been secured to the under side of the curved blades so as to form a guide for the purpose of adjusting the shear to the wick and at the same time serve to catch and retain the severed portion of the wick.

I am also aware that curved blades have been used for shears used in surgery; but the curve on which they are bent is no part of a true circle; whereas in my shears that quality is indispensably necessary in order to make the wick uniform in its arc. I do not therefore claim, broadly, attaching receiving-pans to the blades of shears; neither do I claim, broadly, curving shear-blades; but What I do claim as new, and desire to secure by Letters Patent, is—

A lamp-wick trimmer composed of two curved blades, A A', one of which is provided with a pan on its under side projecting at right angles therefrom, the inner side of said pan forming a guard and also a guide, substantially as described.

ELI BAILEY.

Attest:
H. F. WILLSON,
C. H. LIPPY.